C. E. JOHNSON.
PISTON RING.
APPLICATION FILED OCT. 25, 1915.
1,204,024.
Patented Nov. 7, 1916.
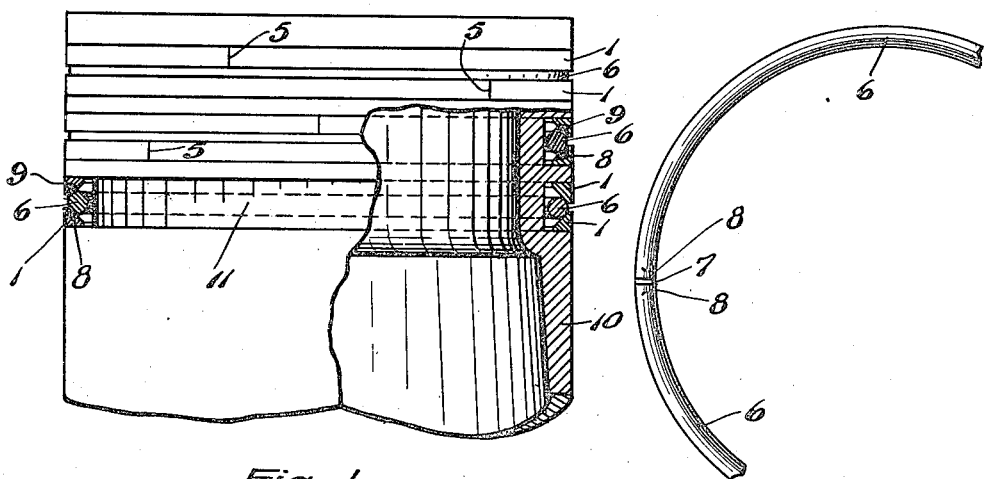
Fig. 1.
Fig. 5.
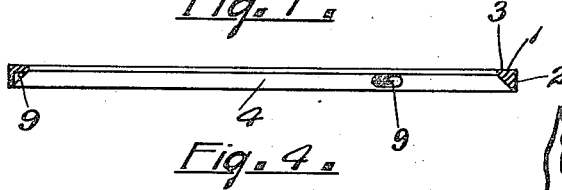
Fig. 4.
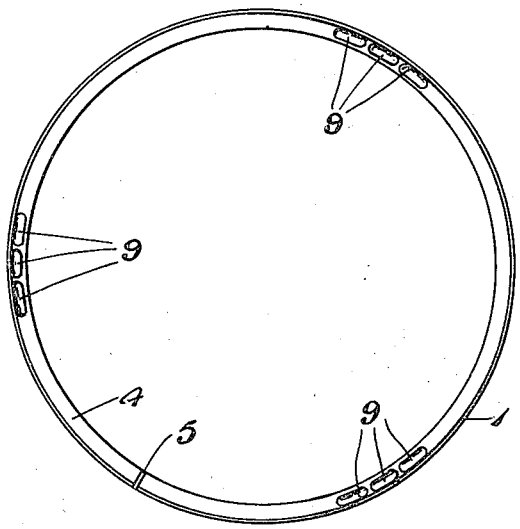
Fig. 3.
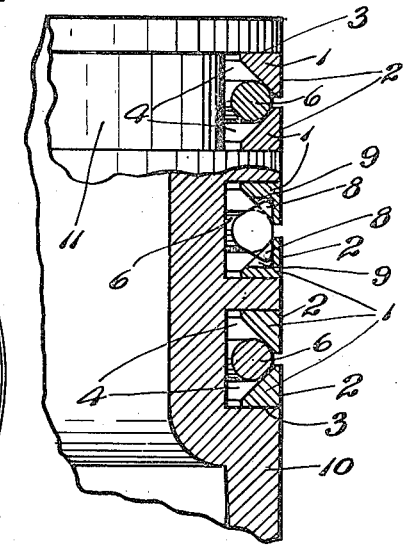
Fig. 2.
Inventor
Charles E Johnson
By Moulton & Livrance
Attorneys.

UNITED STATES PATENT OFFICE.

CHARLES E. JOHNSON, OF MUSKEGON, MICHIGAN.

PISTON-RING.

1,204,024.　　　　Specification of Letters Patent.　　Patented Nov. 7, 1916.

Application filed October 25, 1915. Serial No. 57,752.

*To all whom it may concern:*

Be it known that I, CHARLES E. JOHNSON, a citizen of the United States of America, residing at Muskegon, in the county of Muskegon and State of Michigan, have invented certain new and useful Improvements in Piston-Rings; and I do hereby declare the following to be a full, clear, and exact description of the invention, such as will enable others skilled in the art to which at appertains to make and use the same.

This invention relates to piston rings, and the primary object and purpose thereof is to produce a piston ring of very light weight which shall be of especial value in pistons which are formed from an aluminum alloy for the sake of lightness, said alloy being of lower specific gravity than cast iron from which substantially all pistons at one time were made.

A further object of the invention consists in the provision of novel and useful constructions and assembly of parts to form a piston ring having novel features of function and operation as will appear upon understanding being had of the construction shown in the accompanying drawing, in which:

Figure 1 is an elevation with parts broken away and shown in section of a piston equipped with rings built in accordance with my invention. Fig. 2 is a sectional view of a fragment of the piston showing the rings in section, enlarged. Fig. 3 is a plan view of one of the parts of a piston ring, two of which are used in the construction of a piston ring. Fig. 4 is a vertical section taken through said part of the piston ring; and Fig. 5 is a fragmentary plan view of a portion of the spring ring forming an element of the piston ring.

Like reference characters refer to like parts throughout the several views of the drawing.

In the construction of the piston ring there are provided two ring members 1 which have faces 2 and 3 at right angles to each other, the face 2 being adapted to bear against the inner surface of a cylinder while the face 3 bears against one of the sides of the piston ring groove in which the ring is located. This ring 1 is triangular in cross section and has an inner diagonal face 4 as shown. The ring parts 1 may be made of cast iron and parted by a straight cut at 5 to permit the passage of said parts over the piston head and into the grooves receiving the rings. Two of these ring parts 1 are used in forming each complete ring and in conjunction therewith a curved rod 6 circular in cross section is positioned within each of the ring grooves of the piston bearing against the inclined faces 4 of parts 1. In practice I prefer to make the parts 6 by helically winding a rod or wire upon a mandrel in the same manner that coil springs are formed, the diameter of the mandrel being somewhat smaller than the diameter of the piston, and then sawing the coil thus formed at one side, providing a large number of members 6 with a parting as shown at 7. In practice I also prefer to upset each end of the member 6 at the parting making projections 8 which are adapted to engage in notches 9 formed on the inner surfaces 4 of ring parts 1. These ring parts will be located with their partings 5 out of alinement and with the projections 8 extending into notches 9 it will be impossible for the parts 1 to move so as to bring the partings 5 in alinement or to bring said partings in alinement with the parting 7 in the spring ring 6.

The piston 10 with which these rings are used will be of usual and ordinary construction having therein a plurality of grooves 11 in which the assembled rings are seated. As assembled for use one part 1 is placed as shown in Fig. 5 against the bottom of the groove 11, its diagonal face 4 being on the inner and upper side of the part 1. A second member 1 is placed as shown in Fig. 2 in a reverse position, its diagonal side 4 being on the under and inner side of said ring part 1. The spring member 6 is located within the groove and bears against the inner sides 4 of the rings 1 and by reason of its spring tendency it exerts a pressure holding said parts 1 in position against the upper and lower sides of the groove 11 and also has a tendency to force them outward against the side of the cylinder in which the piston moves.

It will be apparent that this ring is very easily and economically manufactured and that it will be of light construction. Furthermore it will be noted that the sides 3 of the ring parts 1 do not need to be given a grinding fit as is now necessary in the manufacture of ordinary piston rings but may be merely machined, being held in close contact with the upper and lower sides of the grooves 11 by reason of the spring 6. Furthermore if the grooves of the piston should become battered or upset as frequently occurs in pistons made of an aluminum alloy the ring parts 1 will conform to and fit the grooves as they are capable of movement a distance away from each other when necessary.

Slight modifications in detail of construction may be resorted to without departing from my invention which is defined in the appended claims and accordingly I consider myself entitled to all modifications falling within the scope of said claims.

I claim:—

1. A piston ring comprising upper and lower ring parts located one above the other and having inner sides positioned at an angle to each other, each of said ring parts being parted at one point in its circumference, a circular spring member formed of a length of wire into substantially a circle and also parted at one point located between and bearing against the inner angularly positioned sides of said ring parts, said spring member being one coil of a helically wound spring whereby its ends tend to separate both laterally and circumferentially and means on said spring member engaging with the ring parts to hold them against movement with respect to each other.

2. A piston ring comprising upper and lower ring parts located one above the other and having inner sides positioned at an angle to each other, and a circular spring member formed as one coil of a spring helically wound from a rod substantially circular in cross section located between and bearing against the inner angularly positioned sides of said ring parts and tending to force the ring parts outward and against the upper and lower sides of a groove in a piston in which the ring is located, substantially as described.

In testimony whereof I affix my signature.

CHARLES E. JOHNSON.